US008227529B2

(12) United States Patent
Esser et al.

(10) Patent No.: US 8,227,529 B2
(45) Date of Patent: Jul. 24, 2012

(54) AQUEOUS SLURRIES OF FINELY DIVIDED FILLERS, A PROCESS FOR THEIR PREPARATION AND THEIR USE FOR THE PRODUCTION OF PAPERS HAVING A HIGH FILLER CONTENT AND HIGH DRY STRENGTH

(75) Inventors: Anton Esser, Limburgerhof (DE); Hans-Joachim Haehnle, Neustadt (DE); Marc Schroeder, Canton, MI (US)

(73) Assignee: BASF SE, Ludwigshafen (DE)

( * ) Notice: Subject to any disclaimer, the term of this patent is extended or adjusted under 35 U.S.C. 154(b) by 77 days.

(21) Appl. No.: 12/667,592

(22) PCT Filed: Jul. 4, 2008

(86) PCT No.: PCT/EP2008/058642
§ 371 (c)(1),
(2), (4) Date: Jan. 4, 2010

(87) PCT Pub. No.: WO2009/004077
PCT Pub. Date: Jan. 8, 2009

(65) Prior Publication Data
US 2010/0181037 A1    Jul. 22, 2010

(30) Foreign Application Priority Data

Jul. 5, 2007   (EP) .................................... 07111860

(51) Int. Cl.
*C08B 37/00*    (2006.01)
(52) U.S. Cl. .............. 524/48; 524/47; 524/52; 524/556; 523/410; 162/164.6

(58) Field of Classification Search ................... 524/48, 524/47, 52, 556, 559; 523/410, 334, 205; 162/164.6, 164.5, 168, 169, 164.3
See application file for complete search history.

(56) References Cited

U.S. PATENT DOCUMENTS

| 2002/0088579 A1 | 7/2002 | Forsberg et al. |
| 2010/0179248 A1 | 7/2010 | Esser et al. |
| 2010/0181038 A1 | 7/2010 | Esser et al. |

FOREIGN PATENT DOCUMENTS

| EP | 0 251 182 | 1/1988 |
| EP | 0672212 | 9/1995 |
| GB | 1 505 641 | 3/1978 |
| JP | 08059740 | 3/1996 |
| WO | 01 86067 | 11/2001 |
| WO | 03 074786 | 9/2003 |
| WO | 03 087472 | 10/2003 |
| WO | 2004 087818 | 10/2004 |
| WO | 2005 012637 | 2/2005 |

OTHER PUBLICATIONS

U.S. Appl. No. 12/990,763, filed Nov. 2, 2010, Esser, et al.
U.S. Appl. No. 12/996,688, filed Dec. 7, 2010, Haehnle, et al.
U.S. Appl. No. 13/147,623, filed Aug. 3, 2011, Esser, et al.
U.S. Appl. No. 13/058,217, filed Feb. 9, 2011, Haehnle, et al.
U.S. Appl. No. 12/667,477, filed Dec. 31, 2009, Esser, et al.
U.S. Appl. No. 13/376,509, filed Dec. 6, 2011, Jehn-Rendu, et al.

*Primary Examiner* — Mark Halpern
(74) *Attorney, Agent, or Firm* — Oblon, Spivak, McClelland, Maier & Neustadt, L.L.P.

(57) ABSTRACT

Aqueous slurries of finely divided fillers which are at least partly coated with a composition comprising at least one water-soluble amphoteric copolymer and at least one latex.

19 Claims, No Drawings

AQUEOUS SLURRIES OF FINELY DIVIDED FILLERS, A PROCESS FOR THEIR PREPARATION AND THEIR USE FOR THE PRODUCTION OF PAPERS HAVING A HIGH FILLER CONTENT AND HIGH DRY STRENGTH

This application is a 371 of PCT/EP/58642 filed 4 Jul. 2008.

The invention relates to aqueous slurries of finely divided fillers which are at least partly coated with a composition comprising at least one water-soluble amphoteric copolymer and at least one latex, and a process for their preparation and their use as an additive to the paper stock in the production of papers having high filler content and high dry strength.

In the production of filler-containing papers, the filler slurry is added to the fiber suspension before this is passed on to the former of the paper machine. As a rule, a retention aid or retention aid system is added to the filler/fiber suspension in order to retain as much filler as possible in the paper sheet. The addition of the filler to the paper enables the papermaker to achieve numerous improvements of the sheet properties. These include properties such as opacity, whiteness, haptic properties and printability.

If, in addition, the filler is cheaper than the fiber, the addition or increased addition of filler can lead to a reduction in the proportion of fiber and hence to a reduction in the production costs of paper. Filler-containing paper or papers having a particularly high filler content can be more easily dried than papers which do not contain filler and than papers having a lower filler content. As a consequence of this, the paper machine can be operated more rapidly and with lower steam consumption, which both increases the productivity and reduces the costs.

However, the addition of filler to the fiber suspension also has disadvantages which can only be partly compensated by the addition of further paper assistants. For a given basis weight, there are limits with regard to the amount of filler which can be used. The strength properties of the paper are usually the most important parameters which limit the amount of filler in the paper. Other factors too, such as the filler retention, the drainage of the paper stock suspension and any increased chemical demand during retention and sizing, can play a role here.

The loss of strength properties of paper can be completely or partly compensated in some cases by the use of dry and wet strength agents. A customary procedure is the addition of cationic starch as a dry strength agent to the paper stock. Synthetic dry and wet strength agents, for example based on cationic or anionic polyacrylamides, are also used. The added amount and the strengthening effect are, however, limited in most cases. Equally, the compensating effect with respect to the loss of strength by increasing the filler and therefore also the increase in filler which is at all realizable is also limited. In addition, not all strength properties are enhanced to the same degree and in some cases they are insufficiently enhanced by the use of dry strength agents. An important example of this is the tear strength, which is influenced only slightly by the use of starch or synthetic dry strength agents in comparison with other strength parameters. On the other hand, the increase in the filler content in the paper generally has a very strong adverse effect on the tear strength.

Further important properties are the thickness and the stiffness of the paper. With the same basis weight, the increase of the filler content leads to an increase in paper density and a decrease in the thickness of the paper sheet. The latter leads to a considerable decrease in the paper stiffness. In many cases, this decrease in the paper stiffness cannot be compensated by the use of dry strength agents alone. Frequently, additional measures, such as, for example, the reduction of the mechanical pressure in the press section in the calendering units, in calenders or in the dry end of the paper machine, are necessary. The latter completely or partly compensates the loss of thickness by increasing the filler.

Some filler systems are described in the literature. WO 01/86067 A1 discloses the modification of fillers with hydrophobic polymers, the filler particles being coated with the hydrophobic polymer. The hydrophobic polymers according to WO 01/86067 A1 are starch-containing. The papers produced therewith have improved properties, such as wet strength.

JP-A 08059740 discloses that amphoteric water-soluble polymers are added to aqueous suspensions of inorganic particles, at least a part of the polymers being adsorbed on the filler surface. The amphoteric polymers are preferably prepared by hydrolysis of copolymers of N-vinylformamide, acrylonitrile and acrylic acid in the presence of acids. They comprise from 20 to 90 mol % of amidine units of the structure

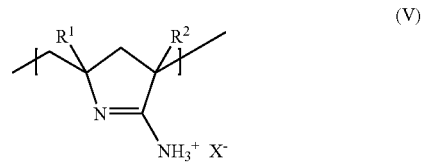

(V)

where $R^1$ and $R^2$ are each H or a methyl group and $X^-$ is an anion. The filler slurries treated with such polymer are added to the paper stock in the production of filler-containing papers. The filler treatment leads to an improvement in the drainage of the paper stock and also results in an improvement in various strength properties of the dried paper and an improvement in the filler retention.

US 2002/0088579 A1 describes the pretreatment of inorganic fillers with cationic, anionic and amphoteric (zwitterionic) polymers. In every case, the treatment consists of at least two stages. First the treatment with a cationic polymer and then the treatment with an anionic polymer are recommended. In further steps, further cationic and anionic polymers can be adsorbed again alternately. The aqueous suspensions with the pretreated filler particles are added to the paper stock in the production of filler-containing paper. The filler treatment leads to an improvement in various strength properties of the dried paper.

WO 04/087818 A1 describes aqueous slurries of finely divided fillers which are at least partly coated with polymer and which are obtainable by treating aqueous slurries of finely divided fillers with at least one water-soluble amphoteric copolymer which is obtainable by copolymerization of
a) at least one N-vinylcarboxamide of the formula

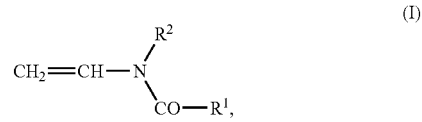

(I)

where $R^1$ and $R^2$ are H or $C_1$- to $C_6$-alkyl,
b) at least one monoethylenically unsaturated carboxylic acid having 3 to 8 carbon atoms in the molecule and/or alkali metal, alkaline earth metal or ammonium salts thereof, and, if appropriate, c) other monoethylenically unsaturated monomers which are free of nitrile groups and, if appropriate,
d) compounds which have at least two ethylenically unsaturated double bonds in the molecule, and subsequent partial or complete elimination of the groups —CO—$R^1$ from the monomers (I) incorporated in the form of polymerized units in the copolymer.

WO 05/012637 A1 discloses aqueous compositions comprising at least one finely divided filler and at least one water-soluble amphoteric copolymer which is obtainable by copolymerization of a monomer mixture comprising a) at least one N-vinylcarboxamide of the general formula

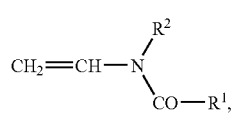
(I)

where $R^1$ and $R^2$, independently of one another, are H or $C_1$- to $C_6$-alkyl, b) at least one monomer which is selected from monoethylenically unsaturated sulfonic acids, phosphonic acids, phosphoric acid esters and derivatives thereof, c) if appropriate, at least one monomer which is selected from monoethylenically unsaturated mono- and dicarboxylic acids, salts thereof and dicarboxylic anhydrides, d) if appropriate, at least one monoethylenically unsaturated monomer which differs from the components a) to c) and is free of nitrile groups, and e) if appropriate, at least one compound which has at least two ethylenically unsaturated double bonds in the molecule, with the proviso that the monomer mixture comprises at least one monomer b) or c) having at least one free acid group and/or an acid group in salt form, and subsequent partial or complete hydrolysis of the groups —CO—$R^1$ from the monomers (I) incorporated in the form of polymerized units in the copolymer.

Accordingly, said publications disclose processes which describe the treatment of fillers by amphoteric synthetic polymers before the addition of the filler slurry to the fiber and the subsequent formation of the paper sheet. In particular, WO 04/087818 A1 and WO 05/012637 A1 showed that, with prior treatment of the filler, the paper sheets have a considerable increase in various dry strength parameters, such as, for example, the breaking length and the internal bonding strength.

WO 03/087472 A1 discloses a process which describes the treatment of fillers with a composition consisting of swollen starch particles and latices. The latices used in this publication are water-insoluble and are present in the form of a dispersion. After separate preparation of this composition, it is added to the filler slurry; finally, the addition to the fiber and the sheet formation are effected. According to the teaching of WO 03/087472 A1, the starch particles are swollen starch particles. Furthermore, the composition may also comprise other coadditives, such as anionic or cationic coadditives. Water-soluble amphoteric copolymers are not disclosed in WO 03/087472 A1.

It was therefore the object of the present invention to provide further alternative aqueous slurries of finely divided fillers which can be used in the production of paper having a high filler content. The papers produced therewith should have strength properties which are comparable with those of conventional papers having a low filler content. These strength properties include in particular the dry breaking length, the internal bonding strength and the stiffness of the paper.

The object is achieved, according to the invention, by aqueous slurries of finely divided fillers which are at least partly coated with a composition comprising at least one water-soluble amphoteric copolymer and at least one latex.

In the context of the present invention, the term latex is understood as meaning water-insoluble homo- and copolymers which are preferably used in the form of dispersions or emulsions.

In a first preferred embodiment (embodiment A) the aqueous slurries according to the invention are obtainable by treating aqueous slurries of finely divided fillers with at least one water-soluble amphoteric copolymer and at least one latex, the water-soluble amphoteric copolymer being obtainable by copolymerization of a monomer mixture of (a) at least one N-vinylcarboxamide of the general formula

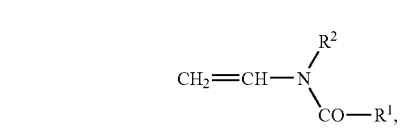
(I)

where $R^1$ and $R^2$, independently of one another, are H or $C_1$- to $C_6$-alkyl, (b) at least one monomer which is selected from the group consisting of
  ($b_1$) monoethylenically unsaturated sulfonic acids, phosphonic acids, phosphoric acid esters and derivatives thereof and
  ($b_2$) monoethylenically unsaturated mono- and dicarboxylic acids, salts thereof and dicarboxylic anhydrides, (c) if appropriate, at least one monoethylenically unsaturated monomer differing from the components (a) and (b), and (d) if appropriate, at least one compound which has at least two ethylenically unsaturated double bonds in the molecule, with the proviso that the monomer mixture comprises at least one monomer (b) having at least one free acid group and/or an acid group in salt form, and subsequent partial or complete hydrolysis of the groups —CO—$R^1$ from the monomers (a) incorporated in the form of polymerized units in the copolymer.

In another, second preferred embodiment (embodiment B) the aqueous slurries according to the invention are obtainable by treating aqueous slurries of finely divided fillers with at least one water-soluble amphoteric copolymer and at least one latex, the water-soluble amphoteric copolymer being obtainable by copolymerization of a monomer mixture of (b) at least one monomer which is selected from the group consisting of
  ($b_1$) monoethylenically unsaturated sulfonic acids, phosphonic acids, phosphoric acid esters and derivatives thereof, and
  ($b_2$) monoethylenically unsaturated mono- and dicarboxylic acids, salts thereof and dicarboxylic anhydrides, (e) at least one ethylenically unsaturated monomer which carries a cationic group and/or a group to which a cationic charge can be imparted by protonation, (f) if appropriate, at least one monoethylenically unsaturated monomer differing from the components (b) and (e), and (d) if appropriate, at least one compound which has at least two ethylenically unsaturated double bonds in the molecule.

The aqueous slurries comprise, for example, from 1 to 70% by weight, preferably from 5 to 50% by weight, particularly preferably from 10 to 40% by weight, of at least one finely divided filler. The amount of water-soluble amphoteric copolymer is, for example, from 0.01 to 5% by weight, preferably from 0.05 to 2.5% by weight, particularly preferably from 0.05 to 1% by weight, based on the filler. The metered amount of the latex is, for example, from 0.1 to 10% by weight, preferably from 0.2 to 7.5% by weight, particularly preferably from 0.2 to 5% by weight, based on the filler.

The present invention furthermore relates to a process for the preparation of the aqueous slurries, an aqueous slurry of at least one finely divided filler being treated with from 0.01 to 5% by weight, based on the filler, of at least one water-soluble amphoteric copolymer and with from 0.1 to 10% by weight, based on the filler, of at least one latex.

In a first preferred embodiment of the process according to the invention, the aqueous slurries of embodiment A are obtainable by treating aqueous slurries of finely divided fillers with at least one water-soluble amphoteric copolymer and at least one latex, the water-soluble amphoteric copolymer being obtainable by copolymerization of a monomer mixture of (a) at least one N-vinylcarboxamide of the general formula

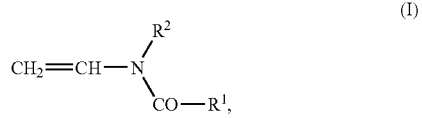

(I)

where $R^1$ and $R^2$, independently of one another, are H or $C_1$- to $C_6$-alkyl, (b) at least one monomer which is selected from the group consisting of
- ($b_1$) monoethylenically unsaturated sulfonic acids, phosphonic acids, phosphoric acid esters and derivatives thereof and
- ($b_2$) monoethylenically unsaturated mono- and dicarboxylic acids, salts thereof and dicarboxylic anhydrides, (c) if appropriate, at least one monoethylenically unsaturated monomer differing from the components (a) and (b), and (d) if appropriate, at least one compound which has at least two ethylenically unsaturated double bonds in the molecule, with the proviso that the monomer mixture comprises at least one monomer (b) having at least one free acid group and/or an acid group in salt form, and subsequent partial or complete hydrolysis of the groups —CO—$R^1$ from the monomers (a) incorporated in the form of polymerized units in the copolymer.

In another, second preferred embodiment of the process according to the invention, aqueous slurries of embodiment B are obtainable by treating aqueous slurries of finely divided fillers with at least one water-soluble amphoteric copolymer and at least one latex, the water-soluble amphoteric copolymer being obtainable by copolymerization of a monomer mixture of (b) at least one monomer which is selected from the group consisting of
- ($b_1$) monoethylenically unsaturated sulfonic acids, phosphonic acids, phosphoric acid esters and derivatives thereof, and
- ($b_2$) monoethylenically unsaturated mono- and dicarboxylic acids, salts thereof and dicarboxylic anhydrides, (e) at least one ethylenically unsaturated monomer which carries a cationic group and/or a group to which a cationic charge can be imparted by protonation, (f) if appropriate, at least one monoethylenically unsaturated monomer differing from the components (b) and (e), and (d) if appropriate, at least one compound which has at least two ethylenically unsaturated double bonds in the molecule.

In the context of the present invention, the expression alkyl comprises straight-chain or branched alkyl groups. Suitable alkyl groups are $C_1$-$C_6$-alkyl, such as, for example, methyl, ethyl, propyl, isopropyl, n-butyl, sec-butyl, tert-butyl, 1,1-dimethylethyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-trimethylpropyl, 1-ethyl-1-methylpropyl or 1-ethyl-2-methylpropyl.

The aqueous slurries of embodiment A comprise in each case at least one monomer of groups (a) and (b) and, if appropriate, at least one monomer of group (c) and, if appropriate, at least one monomer of group (d). Below, water-soluble amphoteric copolymers for aqueous slurries of embodiment A are described in more detail.

Examples of monomers of group (a) are open-chain N-vinylamide compounds of the formula (I), such as, for example, N-vinylformamide, N-vinyl-N-methylformamide, N-vinylacetamide, N-vinyl-N-methylacetamide, N-vinyl-N-ethylacetamide, N-vinylpropionamide and N-vinyl-N-methylpropionamide and N-vinylbutyramide. The monomers of group (a) can be used alone or as a mixture in the copolymerization with the monomers of the other groups.

The aqueous slurries according to the invention comprise at least one monomer of group (b), said monomers being selected from the group consisting of
- ($b_1$) monoethylenically unsaturated sulfonic acids, phosphonic acids, phosphoric acid esters and derivatives thereof, and
- ($b_2$) monoethylenically unsaturated mono- and dicarboxylic acids, salts thereof and dicarboxylic anhydrides.

Suitable monomers of group ($b_1$) are compounds which have an organic radical having one polymerizable, α,β-ethylenically unsaturated double bond and one sulfo or phosphonic acid group per molecule. The salts and esters of the abovementioned compounds are furthermore suitable. The esters of the phosphonic acids may be the monoesters or the diesters. Suitable monomers ($b_1$) are furthermore esters of phosphoric acid with alcohols having a polymerizable, α,β-ethylenically unsaturated double bond. One proton or the two remaining protons of the phosphoric acid group can be neutralized by suitable bases or esterified with alcohols which have no polymerizable double bonds.

Suitable bases for partial or complete neutralization of the acid groups of the monomers ($b_1$) are, for example, alkali metal or alkaline earth metal bases, ammonia, amines and/or alkanolamines. Examples of these are sodium hydroxide, potassium hydroxide, sodium carbonate, potassium carbonate, sodium bicarbonate, potassium bicarbonate, magnesium hydroxide, magnesium oxide, calcium hydroxide, calcium oxide, triethanolamine, ethanolamine, morpholine, diethylenetriamine or tetraethylenepentamine. Suitable alcohols for esterifying the phosphoric acid are, for example, $C_1$-$C_6$-alkanols, such as, for example, methanol, ethanol, n-propanol, isopropanol, n-butanol, sec-butanol, tert-butanol, n-pentanol, n-hexanol and isomers thereof.

The monomers ($b_1$) include, for example, vinylsulfonic acid, allylsulfonic acid, methallylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acid, acrylamidomethylenephosphonic acid, 2-acrylamido-2-methylpropanesulfonic acid, vinylphosphonic acid, $CH_2=CH-NH-CH_2-PO_3H$, monomethyl vinylphosphonate, dimethyl vinylphosphonate, allylphosphonic acid, monomethyl allylphosphonate, dimethyl allylphosphonate, acrylamidomethylpropylphosphonic acid, (meth)acryloylethylene glycol phosphate and monoallyl phosphate.

If exclusively monomers in which all protons of the acid groups are esterified, such as, for example, dimethyl vinylphosphonate or dimethyl allylphosphonate, are used as component ($b_1$), at least one monoethylenically unsaturated mono- and/or dicarboxylic acid or a salt thereof is used for the polymerization, as will be described below as component ($b_2$). Thus, it is ensured that the copolymers used according to the invention have anionogenic/anionic groups. Alternatively, it is also possible to choose the conditions for the hydrolysis so that some of the ester groups are eliminated.

The abovementioned monomers ($b_1$) can be used individually or in the form of any desired mixtures.

Suitable monomers of group ($b_2$) are monoethylenically unsaturated carboxylic acids having 3 to 8 carbon atoms and the water-soluble salts, such as alkali metal, alkaline earth metal or ammonium salts, of these carboxylic acids and the monoethylenically unsaturated carboxylic anhydrides. This group of monomers includes, for example, acrylic acid, methacrylic acid, dimethacrylic acid, ethacrylic acid, α-chloroacrylic acid, maleic acid, maleic anhydride, fumaric acid, itaconic acid, mesaconic acid, citraconic acid, glutaconic acid, aconitic acid, methylenemalonic acid, allylacetic acid, vinylacetic acid and crotonic acid. The monomers of this group ($b_2$) can be used alone or as a mixture with one another, in partly or completely neutralized form, in the copolymerization. Bases suitable for the neutralization are those mentioned in the case of component ($b_1$).

According to the invention, the water-soluble amphoteric copolymer comprises at least one monomer from the group (b) which is selected from the subgroups ($b_1$) and ($b_2$). Of course, the water-soluble amphoteric copolymer may also comprise mixtures of monomers from the subgroups ($b_1$) and ($b_2$).

The copolymers can, if appropriate, comprise at least one further monomer of group (c) incorporated in the form of polymerized units for modification. These monomers are preferably selected from esters of α,β-ethylenically unsaturated mono- and dicarboxylic acids with $C_1$-$C_{30}$-alkanols, $C_2$-$C_{30}$-alkanediols and $C_2$-$C_{30}$-amino alcohols, amides of α,β-ethylenically unsaturated monocarboxylic acids and the N-alkyl- and N,N-dialkyl derivatives thereof, esters of vinyl alcohol and allyl alcohol with $C_1$-$C_{30}$-monocarboxylic acids, N-vinyllactams, nitrogen-containing heterocycles having α,β-ethylenically unsaturated double bonds, vinyl aromatics, vinyl halides, vinylidene halides, $C_2$-$C_8$-monoolefins and mixtures thereof.

Suitable members of this group (c) are, for example, methyl (meth)acrylate, methyl ethacrylate, ethyl (meth)acrylate, ethyl ethacrylate, n-butyl (meth)acrylate, isobutyl (meth)acrylate, tert-butyl (meth)acrylate, tert-butyl ethacrylate, n-octyl (meth)acrylate, 1,1,3,3-tetramethylbutyl (meth) acrylate, ethylhexyl (meth)acrylate and mixtures thereof.

Suitable additional monomers (c) are furthermore esters of α,β-ethylenically unsaturated mono- and dicarboxylic acids with amino alcohols, preferably $C_2$-$C_{12}$-amino alcohols. These may be $C_1$-$C_8$-monoalkylated or $C_1$-$C_8$-dialkylated on the amine nitrogen. Suitable acid components of these esters are, for example, acrylic acid, methacrylic acid, fumaric acid, maleic acid, itaconic acid, crotonic acid, maleic anhydride, monobutyl maleate and mixtures thereof. Acrylic acid, methacrylic acid and mixtures thereof are preferably used. These include, for example, N-methylaminomethyl (meth)acrylate, N-methylaminoethyl (meth)acrylate, N,N-dimethylaminomethyl (meth)acrylate, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate and N,N-dimethylaminocyclohexyl (meth)acrylate.

Suitable additional monomers (c) are furthermore acrylamide, methacrylamide, N-methyl(meth)acrylamide, N-ethyl (meth)acrylamide, n-propyl(meth)acrylamide, N-(n-butyl) (meth)acrylamide, tert-butyl(meth)acrylamide, n-octyl (meth)acrylamide, 1,1,3,3-tetramethylbutyl(meth) acrylamide, ethylhexyl(meth)acrylamide and mixtures thereof.

2-Hydroxyethyl (meth)acrylate, 2-hydroxyethyl ethacrylate, 2-hydroxypropyl (meth)acrylate, 3-hydroxypropyl (meth)acrylate, 3-hydroxybutyl (meth)acrylate, 4-hydroxybutyl (meth)acrylate, 6-hydroxyhexyl (meth)acrylate and mixtures thereof are furthermore suitable as monomers (c).

In addition, N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[2-(diethylamino)ethyl]methacrylamide and mixtures thereof are suitable as further monomers (c).

Further suitable monomers of group (c) are nitriles of α,β-ethylenically unsaturated mono- and dicarboxylic acids, such as, for example, acrylonitrile and methacrylonitrile.

Suitable monomers (c) are furthermore N-vinyllactams and derivatives thereof which may have, for example, one or more $C_1$-$C_6$-alkyl substituents (as defined above). These include N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam and mixtures thereof.

Furthermore, N-vinylimidazoles and alkylvinylimidazoles are suitable as monomers (c), in particular methylvinylimidazoles, such as, for example, 1-vinyl-2-methylimidazole, 3-vinylimidazole N-oxide, 2- and 4-vinylpyridine N-oxides and betaine derivatives and quaternization products of these monomers.

Suitable additional monomers are furthermore ethylene, propylene, isobutylene, butadiene, styrene, α-methylstyrene, vinyl acetate, vinyl propionate, vinyl chloride, vinylidene chloride, vinyl fluoride, vinylidene fluoride and mixtures thereof.

The abovementioned monomers (c) can be used individually or in the form of any desired mixtures.

A further modification of the copolymers is possible by using, in the copolymerization, monomers (d) which comprise at least two double bonds in the molecule, e.g. methylenebisacrylamide, glycol diacrylate, glycol dimethacrylate, glyceryl triacrylate, pentaerythrityl triallyl ether, and polyalkylene glycols or polyols, such as pentaerythritol, sorbitol or glucose, at least diesterified with acrylic acid and/or methacrylic acid. If at least one monomer of group (d) is used in the copolymerization, the amounts used are up to 2 mol %, e.g. from 0.001 to 1 mol %.

In a preferred embodiment, a monomer mixture is used for the polymerization, the component (b) consisting either only of monomers ($b_1$) or only of monomers of subgroup ($b_2$), with the proviso that the monomer mixture comprises at least one monomer (b) having at least one free acid group and/or an acid group in salt form.

In a particularly preferred embodiment, only monomers of subgroup ($b_2$) are used for the polymerization with the monomers (a) of the formula (I).

The water-soluble amphoteric copolymers used according to the invention for aqueous slurries of embodiment A are obtainable, for example, by free radical copolymerization of (a) from 1 to 99% by weight, preferably from 5 to 95% by weight, in particular from 20 to 90% by weight, based on the total weight of the monomers used for the polymerization, of at least one N-vinylcarboxamide of the general formula

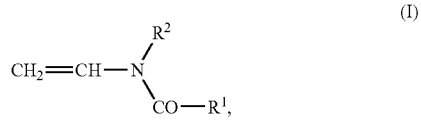

(I)

where $R^1$ and $R^2$, independently of one another, are H or $C_1$- to $C_6$-alkyl, (b) from 1 to 99% by weight, preferably from 5 to 95% by weight, in particular from 10 to 80% by weight, based on the total weight of the monomers used for the polymerization, of at least one monomer which is selected from the group consisting of ($b_1$) monoethylenically unsaturated sulfonic acids, phosphonic acids, phosphoric acid esters and derivatives thereof, and ($b_2$) monoethylenically unsaturated mono- and dicarboxylic acids, salts thereof and dicarboxylic anhydrides, preferably from 1 to 99% by weight, particularly preferably from 5 to 95% by weight, especially preferably from 10 to 80% by weight, based on the total weight of the monomers used for the polymerization, of at least one monomer which is selected from subgroup ($b_2$), (c) from 0 to 30% by weight, preferably from 0.1 to 25% by weight, in particular from 1 to 15% by weight, based on the total weight of the monomers used for the polymerization, of at least one monoethylenically unsaturated monomer differing from the components (a) and (b), and (d) from 0 to 5% by weight, preferably from 0.0001 to 3% by weight, based on the total weight of the monomers used for the polymerization, of at least one compound which has at least two ethylenically unsaturated double bonds in the molecule, with the proviso that the monomer mixture comprises at least one monomer (b) having at least one free acid group and/or an acid group in salt form, and subsequent partial or complete hydrolysis of the monomers (a) in the form of polymerized units in the copolymer.

For example, preferred water-soluble amphoteric copolymers for aqueous slurries of embodiment A are those which are prepared by copolymerization of (a) at least one N-vinylcarboxamide of the general formula

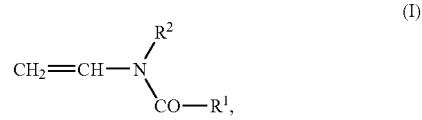

(I)

where $R^1$ and $R^2$, independently of one another, are H or $C_1$- to $C_6$-alkyl, (b) at least one monomer from the group ($b_2$) which is selected from monoethylenically unsaturated carboxylic acids having 3 to 8 carbon atoms and the water-soluble salts, such as alkali metal, alkaline earth metal and ammonium salts, of these carboxylic acids, (c) if appropriate, at least one monoethylenically unsaturated monomer differing from the components (a) and (b), and (d) if appropriate, at least one compound which has at least two ethylenically unsaturated double bonds in the molecule, and subsequent partial or complete hydrolysis of the groups —CO—$R^1$ from the monomers (a) incorporated in the form of polymerized units in the copolymer.

Particularly preferred water-soluble amphoteric copolymers for aqueous slurries of embodiment A are those which are obtainable by copolymerization of (a) N-vinylformamide, (b) acrylic acid, methacrylic acid and/or the alkali metal or ammonium salts thereof and (c) if appropriate, other monoethylenically unsaturated monomers, and subsequent partial or complete hydrolysis of the vinylformamide units present in the copolymers.

The hydrolysis of the water-soluble amphoteric copolymers for aqueous slurries of embodiment A, which copolymers are obtained by the process described above, is effected by known methods, by the action of acids, bases or enzymes, for example hydrochloric acid, sodium hydroxide solution or potassium hydroxide solution. Here, copolymers which comprise vinylamine units of the formula (II) and/or amidine units of the formula (III) and/or (IV)

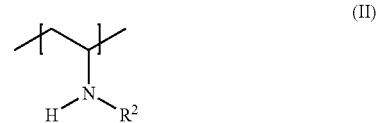

(II)

(III)

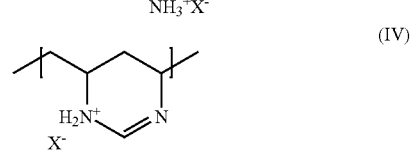

(IV)

where, in the amidine units (III) and (IV), $X^-$ in each case is an anion, form from the monomers (a) of the abovementioned formula (I) which are incorporated in the form of polymerized units, by elimination of the —CO—R¹ group.

The originally anionic copolymer acquires cationic groups thereby and thus becomes amphoteric.

The amidine units (III) and (IV) form by reaction of neighboring vinylamine units of the formula (II) with vinylformamide units or by reaction of neighboring vinylamine units of the formula (II) with (meth)acrylonitrile groups. The sum of vinylamine and amidine units which are formed from the units of N-vinylcarboxamides incorporated in the form of polymerized units is always stated for the water-soluble amphoteric copolymers below.

The hydrolysis of the monomers is disclosed, for example, in EP 0 672 212 B1, on page 4, lines 38-58, and on page 5, lines 1-25. Hydrolyzed copolymers for which the hydrolysis was carried out in the presence of bases, preferably in the presence of sodium hydroxide solution, are preferably used. The degree of hydrolysis of the vinylcarboxamide groups incorporated in the form of polymerized units is, for example, from 0.1 to 100 mol %, in general from 1 to 98 mol %, preferably from 10 to 80 mol %. The degree of hydrolysis should particularly preferably be chosen so that cationic and anionic charges in the water-soluble amphoteric copolymer are approximately compensated, the deviation from charge equality being as a rule not more than 20%.

The hydrolyzed copolymers comprise, for example,
(i) from 1 to 98 mol %, preferably from 1 to 75 mol %, of vinylcarboxamide units,
(ii) from 1 to 98 mol %, preferably from 1 to 55 mol %, of units of monoethylenically unsaturated sulfonic acids, phosphonic acids, phosphoric acid esters, or derivatives thereof, or units of monoethylenically unsaturated mono- and dicarboxylic acids, salts thereof and dicarboxylic anhydrides, preferably from 1 to 98 mol %, preferably from 1 to 55 mol % of units of at least one monoethylenically unsaturated carboxylic acid having 3 to 8 carbon atoms,
(iii) from 1 to 98 mol %, preferably from 1 to 55 mol %, of vinylamine units of the formula (II) and/or amidine units of the formula (III) and/or (IV), and
(iv) up to 30 mol % of units of other monoethylenically unsaturated compounds.

Particularly preferred hydrolyzed copolymers are those which comprise
(i) from 5 to 70 mol % of vinylcarboxamide units,
(ii) from 3 to 30 mol % of units of monoethylenically unsaturated sulfonic acids, phosphonic acids and salts thereof, or from 5 to 45 mol % of units of acrylic acid, methacrylic acid, salts and mixtures thereof, preferably from 15 to 45 mol % of acrylic acid and/or methacrylic acid units and
(iii) from 10 to 50 mol % of vinylamine units in salt form and/or amidine units of the formula (III) and/or (IV).

As described above, aqueous slurries of embodiment B are also preferred. The aqueous slurries of embodiment B comprise in each case at least one monomer of the groups (b) and (e) and, if appropriate, at least one monomer of the group (f) and, if appropriate, at least one monomer of the group (d). Below, water-soluble amphoteric copolymers for aqueous slurries of embodiment B are described in more detail.

The monomers of group (b) are identical to those of group (b) of the water-soluble amphoteric copolymers for aqueous slurries of embodiment A. Likewise identical in both embodiments A and B are the monomers of group (d), which are compounds which have at least two ethylenically unsaturated double bonds in the molecule.

The lists given above, including the preferred embodiments, therefore apply to the monomers of groups (b) and (d).

Suitable monomers of group (e) are the esters of α,β-ethylenically unsaturated mono- and dicarboxylic acids with amino alcohols, preferably $C_2$-$C_{12}$-amino alcohols. These may be $C_1$-$C_8$-monoalkylated or $C_1$-$C_8$-dialkylated on the amine nitrogen. Suitable acid components of these esters are, for example, acrylic acid, methacrylic acid, fumaric acid, maleic acid, itaconic acid, crotonic acid, maleic anhydride, monobutyl maleate and mixtures thereof. Acrylic acid, methacrylic acid and mixtures thereof are preferably used. These include, for example, N-methylaminomethyl (meth)acrylate, N-methylaminoethyl (meth)acrylate, N,N-dimethylaminomethyl (meth)acrylate, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate and N,N-dimethylaminocyclohexyl (meth)acrylate.

The quaternization products of the above compounds with $C_1$-$C_8$-alkyl chlorides, $C_1$-$C_8$-dialkyl sulfates, $C_1$-$C_{16}$-epoxides or benzyl chloride are also suitable.

In addition, N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[2-(diethylamino)ethyl]methacrylamide and mixtures thereof are suitable as further monomers (e).

The quaternization products of the above compounds with $C_1$-$C_8$ alkyl chloride, $C_1$-$C_8$-dialkyl sulfate, $C_1$-$C_{16}$-epoxides or benzyl chloride are also suitable.

Suitable monomers (e) are furthermore N-vinylimidazoles, alkylvinylimidazoles, in particular methylvinylimidazoles, such as 1-vinyl-2-methylimidazole, 3-vinylimidazole-N-oxide, 2- and 4-vinylpyridines, 2- and 4-vinylpyridine-N-oxides and betaine derivatives and quaternization products of these monomers.

Dialkyldiallylammonium chloride is furthermore suitable as a monomer of group (e).

The abovementioned monomers (e) can be used individually or in the form of any desired mixtures.

Suitable monomers (f) are N-vinylcarboxamides of the general formula (I)

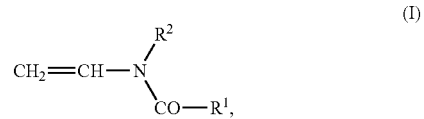

where $R^1$ and $R^2$, independently of one another, are H or $C_1$- to $C_6$-alkyl. Suitable open-chain N-vinylamide compounds of the formula (I) are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide and mixtures thereof.

Esters of α,β-ethylenically unsaturated mono- and dicarboxylic acids with $C_1$-$C_{30}$-alkanols, $C_2$-$C_{30}$-alkanediols, amides of α,β-ethylenically unsaturated monocarboxylic acids and the N-alkyl- and N,N-dialkyl derivatives thereof, esters of vinyl alcohol and allyl alcohol with $C_1$-$C_{30}$-monocarboxylic acids, vinylaromatics, vinyl halides, vinylidene halides, $C_2$-$C_8$-monoolefins and mixtures thereof are furthermore suitable as monomers (f).

Suitable additional monomers (f) are, for example, methyl (meth)acrylate, methyl ethacrylate, ethyl (meth)acrylate, ethyl ethacrylate, n-butyl (meth)acrylate, isobutyl (meth)acrylate, tert-butyl (meth)acrylate, tert-butyl ethacrylate, n-octyl (meth)acrylate, 1,1,3,3-tetramethylbutyl (meth)acrylate, ethylhexyl (meth)acrylate and mixtures thereof.

Suitable additional monomers (f) are furthermore (meth)acrylamides and (meth)acrylonitriles, such as, for example, acrylamide, methacrylamide, N-methyl(meth)acrylamide, N-ethyl(meth)acrylamide, N-propyl(meth)acrylamide, N-(n-butyl)(meth)acrylamide, tert-butyl(meth)acrylamide, n-octyl (meth)acrylamide, 1,1,3,3-tetramethylbutyl(meth)acrylamide, ethylhexyl(meth)acrylamide, acrylonitrile and methacrylonitrile and mixtures thereof.

2-Hydroxyethyl (meth)acrylate, 2-hydroxyethyl ethacrylate, 2-hydroxypropyl (meth)acrylate, 3-hydroxypropyl (meth)acrylate, 3-hydroxybutyl (meth)acrylate, 4-hydroxybutyl (meth)acrylate, 6-hydroxyhexyl (meth)acrylate, etc. and mixtures thereof are suitable as further monomers (f).

Suitable monomers (f) are furthermore N-vinyllactams and derivatives thereof which may have, for example, one or more $C_1$-$C_6$-alkyl substituents, such as methyl, ethyl, n-propyl, isopropyl, n-butyl, sec-butyl, tert-butyl, etc. These include, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable additional monomers (f) are furthermore ethylene, propylene, isobutylene, butadiene, styrene, α-methylstyrene, vinyl chloride, vinylidene chloride, vinyl fluoride, vinylidene fluoride and mixtures thereof.

The water-soluble amphoteric copolymers used according to the invention for aqueous slurries of embodiment B are obtainable, for example, by free radical polymerization of (b) from 1 to 99% by weight, preferably from 5 to 95% by weight, in particular from 10 to 80% by weight, based on the total weight of the monomers used for the polymerization, of at least one monomer which is selected from the group consisting of
  ($b_1$) monoethylenically unsaturated sulfonic acids, phosphonic acids, phosphoric acid esters and derivatives thereof, and
  ($b_2$) monoethylenically unsaturated mono- and dicarboxylic acids, salts thereof and dicarboxylic anhydrides,
  from 1 to 99% by weight, preferably from 5 to 95% by weight, in particular from 10 to 80% by weight, based on the total weight of the monomers used for the polymerization, of at least one monomer which is selected from the subgroup ($b_2$),
(e) from 1 to 99% by weight, preferably from 5 to 95% by weight, in particular from 20 to 90% by weight, based on the total weight of the monomers used for the polymerization, of at least one ethylenically unsaturated monomer which carries a cationic group or a group which can acquire a cationic charge by protonation,
(f) from 0 to 30% by weight, preferably from 0.1 to 25% by weight, in particular from 1 to 15% by weight, based on the total weight of the monomers used for the polymerization, of at least one monoethylenically unsaturated monomer differing from the components (b) and (e) and
(d) from 0 to 5% by weight, preferably from 0.0001 to 3% by weight, based on the total weight of the monomers used for the polymerization, of at least one compound which has at least two ethylenically unsaturated double bonds in the molecule.

For example, preferred water-soluble amphoteric copolymers for aqueous slurries of embodiment B are those which are obtainable by copolymerization of (b) at least one monomer from the group ($b_2$), which is selected from monoethylenically unsaturated carboxylic acids having 3 to 8 carbon atoms and the water-soluble salts, such as alkali metal, alkaline earth metal and ammonium salts, of these carboxylic acids,
(e) at least one ethylenically unsaturated monomer which is selected from the group consisting of the esters of α,β-ethylenically unsaturated mono- and dicarboxylic acids with $C_2$-$C_{12}$-amino alcohols which may be $C_1$-$C_8$-monoalkylated or $C_1$-$C_8$-dialkylated on the amine nitrogen, and the quaternization products of these esters with $C_1$-$C_8$-alkyl chlorides, $C_1$-$C_7$-dialkyl sulfates, $C_1$-$C_{16}$-epoxides or benzyl chloride,
(f) if appropriate, at least one monoethylenically unsaturated monomer which differs from the components (b) and (e) and is selected from the group consisting of the N-vinylcarboxamides of the general formula (I)

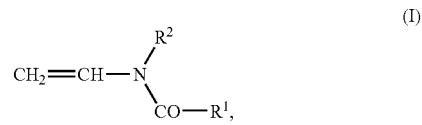

where $R^1$ and $R^2$, independently of one another, are H or $C_1$- to $C_6$-alkyl, (meth)acrylamides and (meth)acrylonitriles, and
(d) if appropriate, at least one compound which has at least two ethylenically unsaturated double bonds in the molecule.

Particularly preferred water-soluble amphoteric copolymers for aqueous slurries of embodiment B are those which are obtainable by copolymerization of (b) acrylic acid, methacrylic acid and/or the alkali metal or ammonium salts thereof,
(e) dimethylaminoethyl (meth)acrylate methochloride,
(f) N-vinylformamide, acrylamide and/or acrylonitrile.

Mixtures in any desired composition of the two embodiments A and B are of course also possible for the preparation of the aqueous slurries according to the invention of finely divided fillers. However, preferably only water-soluble amphoteric copolymers of one embodiment are used.

In addition, embodiments of water-soluble amphoteric copolymers which comprise any desired mixtures of said monomer groups from the two embodiments A and B are also possible.

Regardless of whether they are used in aqueous slurries of embodiment A or B, the water-soluble amphoteric copolymers are prepared by customary processes known to the person skilled in the art. Suitable processes are described, for example, in EP 0 251 182 A1, WO 94/13882 and EP 0 672 212 B1, which is hereby incorporated by reference. Furthermore, reference is made to the preparation of water-soluble amphoteric copolymers described in WO 04/087818 A1 and WO 05/012637.

The water-soluble amphoteric copolymers can be prepared by solution, precipitation, suspension or emulsion polymerization. Solution polymerization in aqueous media is preferred. Suitable aqueous media are water and mixtures of water and at least one water-miscible solvent, e.g. an alcohol, such as methanol, ethanol, n-propanol, etc.

The polymerization temperatures are preferably in a range from about 30 to 200° C., particularly preferably from 40 to 110° C. The polymerization is usually effected under atmospheric pressure but can also take place under reduced or superatmospheric pressure. A suitable pressure range is from 0.1 to 5 bar.

The monomers (b) containing acid groups are preferably used in salt form. For the copolymerization, the pH is preferably adjusted to a value in the range from 6 to 9. By use of a customary buffer or by measurement of the pH and corresponding addition of acid or base, the pH can be kept constant during the polymerization.

For the preparation of the polymers, the monomers can be polymerized with the aid of free radical initiators.

Initiators which may be used for the free radical polymerization are the peroxo and/or azo compounds customary for this purpose, for example alkali metal or ammonium peroxodisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumyl hydroperoxide, diisopropyl peroxodicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, azobis(2-amidinopropane) dihydrochloride or 2,2'-azobis(2-methylbutyronitrile). Initiator mixtures or redox initiator systems, such as, for example, ascorbic acid/iron(II) sulfate/sodium peroxodisulfate, tert-butyl hydroperoxide/sodium disulfite, tert-butyl hydroperoxide/sodium hydroxymethanesulfinate, $H_2O_2/CuI$, are also suitable.

For adjusting the molecular weight, polymerization can be effected in the presence of at least one regulator. Regulators which may be used are the customary compounds known to the person skilled in the art, such as, for example, sulfur compounds, e.g. mercaptoethanol, 2-ethylhexyl thioglycolate, thioglycolic acid, sodium hypophosphite, formic acid or dodecyl mercaptan and tribromochloromethane or other compounds which have a regulating effect on the molecular weight of the polymers obtained.

The molar mass of water-soluble amphoteric copolymers is, for example, at least 10 000, preferably at least 100 000, dalton and in particular at least 500 000 dalton. The molar masses of the copolymers are then, for example, from 10 000 to 10 million, preferably from 100 000 to 5 million (for example, determined by light scattering). This molar mass range corresponds, for example, to K values of from 5 to 300, preferably from 10 to 250 (determined according to H. Fikentscher in 5% strength aqueous sodium chloride solution at 25° C. and a polymer concentration of 0.1% by weight).

The water-soluble amphoteric copolymers may carry an excess anionic or an excess cationic charge or may be electrically neutral if equal numbers of anionic and cationic groups are present in the copolymer. Depending on the charged state of the water-soluble amphoteric copolymers, the aqueous slurries of fillers prepared therewith are anionic, cationic or electrically neutral if the water-soluble amphoteric copolymers have the same quantity of cationic and anionic charge.

Preferably used water-soluble amphoteric copolymers are those which have a charge density of, preferably, not more than 1 meq/g at pH 7, both in the anionic and in the cationic range.

According to the invention, the water-soluble amphoteric copolymers are used for the treatment of finely divided fillers. Suitable fillers are all pigments which can be used in the paper industry and comprise inorganic material, e.g. calcium carbonate, which can be used in the form of ground lime (GCC), chalk, marble or precipitative calcium carbonate (PCC), talc, kaolin, bentonite, satin white, calcium sulfate, barium sulfate and titanium dioxide. It is also possible to use mixtures of two or more pigments. The median particle diameter is, for example, in the range from 0.5 to 30 μm, preferably from 1 to 10 μm.

The aqueous slurries according to the invention furthermore comprise at least one latex, i.e. at least one water-insoluble homo- or copolymer, which is likewise used for the treatment of the finely divided fillers.

The latex preferably comprises at least 40% by weight, preferably at least 60% by weight, particularly preferably at least 80% by weight, of so-called main monomers (g).

The main monomers (g) are selected from $C_1$-$C_{20}$-alkyl (meth)acrylates, vinyl esters of carboxylic acids comprising up to 20 carbon atoms, vinyl aromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers.

For example, alkyl (meth)acrylates having a $C_1$-$C_{10}$-alkyl radical, such as methyl methacrylate, methyl acrylate, n-butyl acrylate, ethyl acrylate and 2-ethylhexyl acrylate, may be mentioned.

In particular, mixtures of the alkyl (meth)acrylate are also suitable.

Vinyl esters of carboxylic acids having 1 to 20 carbon atoms are, for example, vinyl laurate, vinyl stearate, vinyl propionate, vinyl versatate and vinyl acetate.

Suitable vinylaromatic compounds are vinyltoluene, α- and p-methylstyrene, α-butylstyrene, 4-n-butylstyrene, 4-n-decylstyrene and preferably styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

For example, vinyl methyl ether or vinyl isobutyl ether may be mentioned as vinyl ethers. Vinyl ethers of alcohols comprising 1 to 4 carbon atoms are preferred.

Ethylene, propylene, butadiene, isoprene and chloroprene may be mentioned as aliphatic hydrocarbons having 2 to 8 carbon atoms and one or two olefinic double bonds.

Preferred main monomers (g) are $C_1$-$C_{20}$-alkyl (meth)acrylates and mixtures of the alkyl (meth)acrylates with vinylaromatics, in particular styrene (was also summarized as polyacrylate latex) or hydrocarbons having 2 double bonds, in particular butadiene, or mixtures of such hydrocarbons with vinylaromatics, in particular styrene (also summarized as polybutadiene latex).

In the case of polyacrylate latices, the weight ratio of alkyl(meth)acrylates to vinylaromatics (in particular styrene) may be, for example, from 10:90 to 90:10, preferably from 20:80 to 80:20.

In the case of polybutadiene latices, the weight ratio of butadiene to vinylaromatics (in particular styrene) may be, for example, from 10:90 to 90:10, preferably from 20:80 to 80:20.

In addition to the main monomers (g), the latex may comprise further monomers (h), for example monomers having carboxyl, sulfo or phosphonic acid groups. Carboxyl groups are preferred. For example, acrylic acid, methacrylic acid, itaconic acid, maleic acid or fumaric acid and aconitic acid may be mentioned. The content of ethylenically unsaturated acids in the latex is in general less than 10% by weight.

Further monomers (h) are, for example, monomers comprising hydroxyl groups, in particular $C_1$-$C_{10}$-hydroxyalkyl (meth)acrylates, or amides, such as (meth)acrylamide.

Further monomers (h) are compounds which have at least two double bonds capable of free radical polymerization, preferably 2 to 6, particularly preferably 2 to 4, very particularly preferably 2 or 3 and in particular 2. Such compounds are also referred to as crosslinking agents.

The at least two double bonds of the crosslinking agents (h) which are capable of free radical polymerization may be selected from the group consisting of (meth)acryloyl, vinyl ether, vinyl ester, allyl ether and allyl ester groups. Examples of crosslinking agents (h) are 1,2-ethanediol di(meth)acrylate, 1,3-propanediol di(meth)acrylate, 1,2-propanediol di(meth)acrylate, 1,4-butanediol di(meth)acrylate, 1,6-hexanediol di(meth)acrylate, neopentylglycol di(meth)acrylate, trimethylolpropanetriol di(meth)acrylate, pentaerythrityl tetra(meth)acrylate, 1,4-butanediol divinyl ether, 1,6-hexanediol divinyl ether, 1,4-cyclohexanediol divinyl ether, divinylbenzene, allyl acrylate, allyl methacrylate, methallyl acrylate, methallyl methacrylate, but-3-en-2-yl (meth)acrylate, but-2-en-1-yl (meth)acrylate, 3-methylbut-2-en-1-yl (meth)acrylate, esters of (meth)acrylic acid with geraniol, citronellol, cinnamic alcohol, glyceryl mono- or diallyl ether, trimethylolpropane mono- or diallyl ether, ethylene glycol monoallyl ether, diethylene glycol monoallyl ether, propylene glycol monoallyl ether, dipropylene glycol monoallyl ether, 1,3-propanediol monoallyl ether, 1,4-butanediol monoallyl ether and furthermore diallyl itaconate. Allyl acrylate, divinylbenzene, 1,4-butanediol diacrylate and 1,6-hexanediol diacrylate are preferred.

Preferably used polyacrylate latices are those which are composed of vinyl aromatics, alkyl (meth)acrylates and furthermore hydrophilic monomers, such as, for example, (meth)acrylonitrile, (meth)acrylamide and (meth)acrylic acid. For example, such preferred polyacrylate latices comprise 20-50% by weight of styrene, 30-80% by weight of alkyl (meth)acrylates and 0-30% by weight of further hydrophilic monomers, such as, for example, (meth)acrylonitrile, (meth)acrylamide and (meth)acrylic acid.

The latices are prepared as a rule by emulsion polymerization and the polymer is therefore an emulsion polymer. The preparation of aqueous polymer dispersions by the free radical emulsion polymerization process is known per se (cf. Houben-Weyl, Methoden der organischen Chemie, volume XIV, Makromolekulare Stoffe, loc. cit., page 133 et seq.).

In the emulsion polymerization for the preparation of the latices, ionic and/or nonionic emulsifiers and/or protective colloids or stabilizers are used as surface-active compounds. The surface-active substance is usually used in amounts of from 0.1 to 10% by weight, in particular from 0.2 to 3% by weight, based on the monomers to be polymerized.

Customary emulsifiers are, for example, ammonium or alkali metal salts of higher fatty alcohol sulfates, such as sodium n-laurylsulfate, fatty alcohol phosphates, ethoxylated $C_8$- to $C_{10}$-alkyl phenols having a degree of ethoxylation of from 3 to 30 and ethoxylated $C_8$- to $C_{25}$-fatty alcohols having a degree of ethoxylation of from 5 to 50. Mixtures of nonionic and ionic emulsifiers are also conceivable. Ethoxylated and/or propoxylated alkylphenols and/or fatty alcohols containing phosphate or sulphate groups are furthermore suitable. Further suitable emulsifiers are mentioned in Houben-Weyl, Methoden der organischen Chemie, volume XIV, Makromolekulare Stoffe, Georg Thieme Verlag, Stuttgart, 1961, pages 192 to 209.

Water-soluble initiators for the emulsion polymerization for the preparation of the latices are, for example, ammonium and alkali metal salts of peroxodisulfuric acid, e.g. sodium peroxodisulfate, hydrogen peroxide or organic peroxides, e.g. tert-butyl hydroperoxide.

So-called reduction-oxidation (redox) initiator systems are also suitable.

The amount of initiators is in general from 0.1 to 10% by weight, preferably from 0.5 to 5% by weight, based on the monomers to be polymerized. It is also possible to use a plurality of different initiators in the emulsion polymerization.

Regulators may be used in the emulsion polymerization, for example in amounts of from 0 to 3 parts by weight, based on 100 parts by weight of the monomers to be polymerized, by means of which the molar mass is reduced. For example, compounds having a thiol group, such as tert-butyl mercaptan, thioglycolic acid ethyl acrylate, mercaptoethynol, mercaptopropyltrimethoxysilane or tert-dodecyl mercaptan or regulators without a thiol group, in particular, for example, terpinolene, are suitable.

The emulsion polymerization for the preparation of the latices is effected as a rule at from 30 to 130° C., preferably at from 50 to 100° C. The polymerization medium may consist either only of water or of mixtures of water and liquids miscible therewith, such as methanol. Preferably, only water is used. The emulsion polymerization can be carried out both as a batch process and in the form of a feed process, including step or gradient procedure. The feed process is preferred, in which a part of the polymerization batch is initially taken, heated to the polymerization temperature and prepolymerized and the remainder of the polymerization batch is then fed to the polymerization zone continuously, stepwise or with superposition of a concentration gradient, usually over a plurality of spatially separate feeds, one or more of which comprise the monomers in pure or in emulsified form, while maintaining the polymerization. In the polymerization, a polymer seed may also be initially taken, for example for better adjustment of the particle size.

The manner in which the initiator is added to the polymerization vessel in the course of the free radical aqueous emulsion polymerization is known to the average person skilled in the art. It can either be completely initially taken in the polymerization vessel or used continuously or stepwise at the rate of its consumption in the course of the free radical aqueous emulsion polymerization. Specifically, this depends on the chemical nature of the initiator system as well as on the polymerization temperature. Preferably, a part is initially taken and the remainder is fed to the polymerization zone according to the rate of consumption.

For removing the residual monomers, initiator is usually also added after the end of the actual emulsion polymerization, i.e. after a monomer conversion of at least 95%.

In the feed process, the individual components can be added to the reactor from above, at the side or from below through the reactor base.

After the (co)polymerization the acid groups present in the latex can also be at least partly neutralized. This can be effected, for example, with oxides, hydroxides, carbonates or bicarbonates of alkali metals or alkaline earth metals, preferably with hydroxides, with which any desired opposite ion or a plurality of opposite ions may be associated, e.g. $Li^+$, $Na^+$, $K^+$, $Cs^+$, $Mg^{2+}$, $Ca^{2+}$ or $Ba^{2+}$. Ammonia or amines are furthermore suitable for the neutralization. Aqueous ammonium hydroxide, sodium hydroxide or potassium hydroxide solutions are preferred.

In the emulsion polymerization, aqueous dispersions of the latices having as a rule solids contents of from 15 to 75% by weight, preferably from 40% to 75% by weight, are obtained.

The glass transition temperature Tg of the latices is, for example, in the range from −30 to 100° C., preferably in the range from −5 to 70° C. and particularly preferably in the range from 0 to 40° C. (measured by the DSC method according to DIN EN ISO 11357).

The particle size of the latices is preferably in the range from 10 to 1000 nm, particularly preferably in the range from 50 to 300 nm (measured using a Malvern® Autosizer 2 C).

In addition, the aqueous slurries according to the invention, of finely divided fillers may also comprise, in addition to the water-soluble amphoteric copolymers and the latices, further components which are likewise used for the treatment of the finely divided fillers. A swollen starch is preferably used as a third component for the treatment of the finely divided fillers.

Regardless of the type of starch used, this swollen starch is clearly distinguishable from the completely digested starch usually used in the paper industry. In the case of the completely digested starch usually used, the starch grains have completely burst, the starch being present in the form of a molecular dispersion. In contrast, the starch in the aqueous slurries according to the invention is swollen, i.e. the starch particles are swollen but substantially non-fragmented starch particles. The starch is swollen but has retained its granular structure. Starch particles swollen in this manner have as a rule a size in the range from 5 to 90 µm, preferably from 30 to 70 µm, depending on the type of starch used.

Swollen starch is obtained by treatment of an aqueous composition comprising unswollen starch with hot water. This treatment is effected below the gelatinization temperature relevant for the respective types of starch, so that it is ensured that the starch particles only swell and do not burst. The temperature of the added hot water and the residence time of the starch grains in the hot environment are dependent on the type of starch used; as a rule, however, the hot water has temperatures in the range from 50 to 85° C., preferably in the range from 60 to 80° C. and particularly preferably in the range from 70 to 75° C.

The swelling process is stopped after a certain time, which must be determined depending on the type of starch used and the temperature of the hot water, preferably by adding cold water to the warm aqueous starch mixture.

The swelling of the starch is described in WO 03/087472 A1, which is hereby incorporated by reference.

Suitable types of starch are all starches which are customary in the paper industry and may be anionic, cationic or amphoteric. The average molar masses $M_w$ of the starches are, for example, in the range from 50 000 to 150 000 000, preferably in the range from 100 000 to 100 000 000, particularly preferably in the range from 200 000 to 50 000 000. The average molecular weights $M_w$ of the starches can be determined by methods known to the person skilled in the art, for example by means of gel permeation chromatography using a multiangle scattered light detector.

Suitable types of starch are natural starches, such as potato, wheat, corn, rice or tapioca starch, potato starch being preferred. It is also possible to use chemically modified starches, such as hydroxyethyl or hydroxypropyl starches, or starches which comprise anionic groups, such as, for example, phosphate starch, or cationic starches which comprise quaternary ammonium groups, a degree of substitution DS=0.01 to 0.2 being preferred. The degree of substitution DS indicates the number of cationic groups which are present on average per glucose unit in the starch. Amphoteric starches which comprise both quaternary ammonium groups and anionic groups, such as carboxylate and/or phosphate groups, and which, if appropriate, may also be chemically modified, e.g. hydroxyalkylated or alkyl-esterified, are particularly preferred. The starches can be used individually but also in any desired mixtures with one another.

The amount of swollen starch is in general from 0.1 to 10% by weight, preferably in the range from 0.2 to 5% by weight and particularly preferably in the range from 0.5 to 2.5% by weight, based in each case on the filler.

As described above, the present invention also relates to a process for the preparation of the aqueous slurries. Aqueous slurries are obtained by treating an aqueous slurry of at least one finely divided filler with from 0.01 to 5% by weight, based on the filler, of at least one water-soluble amphoteric copolymer and with from 0.1 to 10% by weight, based on the filler, of at least one latex.

The treatment of the finely divided filler with the water-soluble amphoteric copolymer and the latex can be effected in various ways. In principle, any conceivable combination of the three components, water-soluble amphoteric copolymer, latex and filler, is possible.

For example, the treatment of the aqueous slurry of at least one finely divided filler with at least one water-soluble amphoteric copolymer and at least one latex can be effected as follows:

(A) preparation of an aqueous slurry comprising at least one finely divided filler, addition of an aqueous dispersion of at least one latex, subsequent addition of an aqueous solution of at least one water-soluble amphoteric copolymer to this filler-latex composition, or (B) preparation of an aqueous slurry comprising at least one finely divided filler, addition of an aqueous solution of at least one water-soluble amphoteric copolymer, addition of an aqueous dispersion of at least one latex to this filler-copolymer composition.

In all variants, the preparation of an aqueous slurry of finely divided filler is first effected, into which slurry the other two components—water-soluble amphoteric copolymer and latex—are metered in succession. The fillers are processed, for example, by introduction into water to give an aqueous slurry. Precipitated calcium carbonate is usually suspended in water in the absence of dispersants. In order to prepare aqueous slurries of the other fillers, as a rule an anionic dispersant, e.g. polyacrylic acid having an average molar mass $M_w$ of, for example, from 1 000 to 40 000 dalton, is used. If an anionic dispersant is used, for example, from 0.01 to 0.5% by weight, preferably from 0.2 to 0.3% by weight, thereof is employed for the preparation of aqueous filler slurries. The finely divided fillers dispersed in water in the presence of anionic dispersants are anionic. The aqueous slurries comprise, for example, from 10 to 30% by weight, in general 15-25% by weight, of at least one filler.

In a preferred embodiment of the process according to the invention, the stability of the latex dispersion is first reduced, independently of the sequence of addition of the individual components. In general, a reduction in the stability of the latex dispersion may be advantageous, with the result that better affinity of the latex to the pigment surface is achieved. For example, the reduction of the stability of the latex dispersion can be achieved by:

a) heating the aqueous dispersion of at least one latex to 70° C. before the addition, b) change of pH, c) addition of inorganic ions having an opposite charge to the latex dispersion, in particular addition of ions such as $Ca^{2+}$ or $Al^{3+}$, d) addition of multiply charged organic compounds which have an opposite charge to the latex dispersion, e) addition of polyelectrolytes which have an opposite charge to the latex dispersion, f) addition of organic solvents, such as, for example, acetone, or g) addition of hydrophobic opposite ions, such as, for example, tetraalkylammonium ions.

As described above, the aqueous slurries of the finely divided fillers may also be treated with further components, at least one swollen starch being preferred. The amount of swollen starch is in general from 0.1 to 10% by weight, based on the filler. In principle, any conceivable combination of all components—filler, water-soluble amphoteric copolymer, latex and starch—is possible. It is possible both to admix the starch in the unswollen state with at least one of the other components and then to carry out the swelling in the presence of this at least one component and to carry out the swelling of the starch independently of the other components and then to admix the swollen starch with at least one of the other components.

The treatment of the aqueous slurry of finely divided fillers with the water-soluble amphoteric copolymers, the latices and, if appropriate, the swollen starch can be carried out continuously or batchwise, independently of the sequence of addition of the aqueous slurries or solutions of the components—filler, water-soluble amphoteric copolymer, latex and, if appropriate, starch. On combination of aqueous slurries and finely divided fillers, aqueous dispersions of latices, aqueous solutions of water-soluble amphoteric copolymers and, if appropriate, aqueous slurries of swollen starch, the filler particles are at least partly coated or impregnated with the water-soluble amphoteric copolymers, the latices, and, if appropriate, the swollen starch.

The mixing of the components is effected, for example, in a shear field. In general, it is sufficient if the components are stirred or are treated in a shear field of Ultraturrax apparatus after combination. The combination and mixing of the constituents of the aqueous slurries can be effected, for example, in the temperature range from 0° C. to 60° C., preferably from 10 to 50° C. In general, the components are mixed at the respective room temperature up to a temperature of 40° C. The pH of the aqueous slurries of finely divided fillers, which slurries have been treated with water-soluble amphoteric copolymers and swollen starch, is, for example, from 5 to 11, preferably from 6 to 9, the pH of slurries comprising calcium carbonate preferably being more than 6.5.

The water-soluble amphoteric copolymers have a relatively large number of ionically dissociatable/dissociated groups of opposite chargeability/charge which are bonded to the polymer chain. On bringing into contact with aqueous slurries of finely divided fillers Coulomb interactions may occur. On bringing into contact, in general at least partial occupation of the surface of the polymer particles thus takes place. This can be shown, for example, by transmission electron microscopy (TEM). The surface charge can additionally be measured by zeta potential measurements, which show that the charge is on the outside. The electrophoretic mobility and the zeta potential can be determined by a laser optical method. For example, a Zetasizer 3000 HS from Malvern Instruments Ltd. is used as a metric instrument.

The invention furthermore relates to the use of the aqueous slurries described above as an additive to the paper stock in the production of filler-containing paper, filler-containing cardboard or filler-containing board by drainage of the paper stock.

Specifically, these are filler-containing papers such as, for example, wood-free uncoated printing, writing or copying paper and wood-containing uncoated papers such as, for example, recycled newsprint or SC papers for the offset or gravure printing sector. By treatment of the filler added to the paper with at least one latex in combination with at least one water-soluble amphoteric copolymer, the filler content of the paper can be substantially increased with virtually unchanged strength properties. The filler-containing papers, cardboards and boards obtained using the aqueous slurries according to the invention have strength properties which are comparable with those of conventional papers having a low solids content.

The fillers pretreated by the process described above are mixed with the fiber in order thus to form the total paper stock. In addition to the treated fillers and fibers the total stock may also comprise other conventional paper additives. These include, for example, sizes, such as alkylketene dimers (AKD), alkenylsuccinic anhydrides (ASA), rosin size, wet strength agents, cationic or anionic retention aids based on synthetic polymers. Suitable retention aids are, for example, anionic microparticles (colloidal silica, bentonite), anionic polyacrylamides, cationic polyacrylamides, cationic starch, cationic polyethylenimine or cationic polyvinylamine. In addition, any desired combinations thereof are conceivable, such as, for example, dual systems, which consist of a cationic polymer with an anionic microparticle or an anionic polymer with a cationic microparticle.

The invention is explained in more detail with reference to the following, nonlimiting examples.

The stated percentages in the examples are percentages by weight, unless evident otherwise from the context.

In the examples, the following water-soluble amphoteric copolymers are used:

Copolymer 1: water-soluble amphoteric copolymer having a molecular weight $M_w$ of about 2 000 000 g/mol; having a content of 35 mol % of vinylformamide units, 30 mol % of acrylic acid units and 35 mol % of vinylamine and amide units Copolymer 2: water-soluble amphoteric copolymer having a molecular weight $M_w$ of about 500 000 g/mol, corresponding to example 1 from WO 04/087818 A1; having a content of 40 mol % of vinylformamide units, 30 mol % of acrylic acid units and 30 mol % of vinylamine and amidine units

EXAMPLE 1

A 20% strength by weight aqueous slurry of precipitated calcium carbonate (PCC) was heated to 45° C. with gentle stirring. 1.8 g of a 50% strength by weight dispersion of an anionic latex (Catiofast® PR 5335 X, BASF Aktiengesellschaft) were mixed with 150 g of this aqueous PCC slurry with gentle stirring. 0.6 g of a 10% strength by weight aqueous solution of the amphoteric copolymer 1 was mixed with this mixture, likewise with gentle stirring. Thereafter, the total mixture was stirred with the aid of a Heiltof stirrer at 1000 revolutions per minute (rpm). The pH of the mixture was then adjusted to 8.5.

EXAMPLE 2

A 20% strength by weight aqueous slurry of precipitated calcium carbonate (PCC) was heated to 45° C. with gentle stirring. 0.6 g of a 10% strength by weight aqueous solution of the amphoteric copolymer 1 was mixed with 150 g of this aqueous PCC slurry with gentle stirring. 1.8 g of a 50% strength by weight dispersion of an anionic latex (Catiofast® PR 5335 X, BASF Aktiengesellschaft) were then mixed with this mixture, likewise with gentle stirring. Thereafter, the total mixture was stirred with the aid of a Heiltof stirrer at 1000 rpm. The pH of the mixture was then adjusted to 8.5.

EXAMPLE 3

0.6 g of a 10% strength by weight aqueous solution of the amphoteric copolymer 1 was initially taken in a beaker and then diluted with 30 g of water. 1.8 g of a 50% strength by weight dispersion of an anionic latex (Catiofast® PR 5335 X, BASF Aktiengesellschaft) were then added with gentle stirring. Thereafter, 150 g of a 20% strength by weight slurry of precipitated calcium carbonate (PCC) in water were added, said slurry having been heated to 45° C. beforehand. During the addition of the PCC slurry and thereafter, the mixture was stirred at 1000 rpm with the aid of a Heiltof stirrer. The pH of the mixture was then adjusted to 8.5.

EXAMPLE 4

A 30% strength by weight aqueous slurry of a commercially available kaolin clay was heated to 55° C. with gentle stirring. 2.7 g of a 50% strength by weight dispersion of an anionic latex (Catiofast® PR 5335 X, BASF Aktiengesellschaft) were mixed with 150 g of this aqueous kaolin clay slurry with gentle stirring. 0.9 g of a 10% strength by weight aqueous solution of the amphoteric copolymer 1 was mixed with this mixture, likewise with gentle stirring. Thereafter, the total mixture was stirred with the aid of a Heiltof stirrer at 1000 rpm. The pH of the mixture was then adjusted to 8.5.

EXAMPLE 5

A 30% strength by weight aqueous slurry of a commercially available kaolin clay was heated to 55° C. with gentle stirring. 0.9 g of a 10% strength by weight aqueous solution of the amphoteric copolymer 1 was mixed with 150 g of this aqueous kaolin slurry with gentle stirring. 2.7 g of a 50% strength by weight dispersion of an anionic latex (Catiofast® PR 5335 X, BASF Aktiengesellschaft) were then mixed with this mixture, likewise with gentle stirring. Thereafter, the total mixture was stirred at 1000 rpm with the aid of a Heiltof stirrer. The pH of the mixture was then adjusted to 8.5.

EXAMPLE 6

0.9 g of a 10% strength by weight aqueous solution of the amphoteric copolymer 1 was initially taken in a beaker and then diluted with 30 g of water. 2.7 g of a 50% strength by weight dispersion of an anionic latex (Catiofast® PR 5335 X, BASF Aktiengesellschaft) were then added with gentle stirring. Thereafter, 150 g of a 30% strength by weight slurry of a commercially available kaolin clay in water were added, said slurry having been heated to 55° C. beforehand. During the addition of the kaolin clay slurry and thereafter, the mixture was stirred at 1000 rpm with the aid of a Heiltof stirrer. The pH of the mixture was then adjusted to 8.5.

COMPARATIVE EXAMPLE 1

Comparison According to WO 04/087818 A1,
Example 1

1 g of a 12% strength by weight aqueous solution of the amphoteric copolymer 2 was initially taken in a beaker and then diluted with 30 g of water. Thereafter, 150 g of a 20% strength by weight slurry of precipitated calcium carbonate (PCC) in water were added, said slurry having been heated to 45° C. beforehand. During the addition of the PCC slurry and thereafter, the mixture was stirred at 1000 rpm with the aid of a Heiltof stirrer. The pH of the mixture was then adjusted to 8.5.

COMPARATIVE EXAMPLE 2

Comparison According to WO 04/087818 A1,
Example 7

1.5 g of a 12% strength by weight aqueous solution of the amphoteric copolymer 2 were initially taken in a beaker and then diluted with 30 g of water. Thereafter, 150 g of a 30% strength by weight slurry of a commercially available kaolin clay in water were added, said slurry having been heated to 45° C. beforehand. During the addition of the kaolin clay slurry and thereafter, the mixture was stirred at 1000 rpm with the aid of a Heiltof stirrer. The pH of the mixture was then adjusted to 8.5.

COMPARATIVE EXAMPLE 3

Comparison According to WO 03/087472 A1

Cationic waxy corn starch having a degree of substitution of 0.035 was suspended in water at 25° C. to give a 20% strength by weight slurry. 1.8 g of a 50% strength by weight dispersion of an anionic latex (Catiofast® PR 5335 X, BASF Aktiengesellschaft) were then admixed. This mixture was then diluted with 400 ml of hot water (75° C.) and gently stirred for 90 seconds. Thereafter, 25 ml of the dilute slurry were taken and placed in a beaker. Thereafter, 150 g of a 20% strength by weight aqueous slurry of precipitated calcium carbonate (PCC) were added with gentle stirring, said slurry having been left at room temperature (about 25° C.). During the addition of the PCC slurry and thereafter, the mixture was stirred at 1000 rpm with the aid of a Heiltof stirrer. The pH of the mixture was then adjusted to 8.5.

COMPARATIVE EXAMPLE 4

Comparison According to WO 03/087472 A1

Cationic waxy corn starch having a degree of substitution of 0.035 was suspended in water at 25° C. to give a 30% strength by weight slurry. 2.7 g of a 50% strength by weight dispersion of an anionic latex (Catiofast® PR 5335 X, BASF Aktiengesellschaft) were then admixed. This mixture was then diluted with 400 ml of hot water (75° C.) and gently stirred for 90 seconds. Thereafter, 25 ml of the dilute slurry were taken and placed in a beaker. Thereafter, 150 g of a 30% strength by weight aqueous slurry of a commercially available kaolin clay were added with gentle stirring, said slurry having been left at room temperature (about 25° C.). During the addition of the kaolin clay slurry and thereafter, the mixture was stirred at 1000 rpm with the aid of a Heiltof stirrer. The pH of the mixture was then adjusted to 8.5.

Production of Filler-Containing Paper
Papers of Type A

EXAMPLES 7-15

COMPARATIVE EXAMPLES 5-13

A mixture of bleached birch sulfate and bleached pine sulfite was beaten gel-free in the ratio of 70/30 at a solids concentration of 4% in a laboratory pulper until a freeness of 30-35 was reached. An optical brightener (Blankophor® PSG, Bayer AG) and a cationic starch (HiCat® 5163 A) were then added to the beaten stock. The digestion of the cationic starch was effected as 10% strength by weight starch slurry in a jet digester at 130° C. and with a residence time of 1 minute.

The metered amount of the optical brightener was 0.5% by weight of commercial product, based on the solids content of the paper stock suspension. The metered amount of the cationic starch was 0.5% by weight of starch, based on the solids content of the paper stock suspension. The pH of the stock was in the range from 7 to 8. The beaten stock was then diluted to a solids concentration of 0.35% by weight by addition of water.

In order to determine the behavior of the aqueous filler slurries described above in the production of filler-containing paper, in each case 500 ml of the paper stock suspension were initially taken and in each case the slurries treated according to the examples and a cationic polyacrylamide as a retention aid (Polymin® KE 440, BASF Aktiengesellschaft) were metered into this pulp. The metered amount of the retention aid was in all cases 0.01% by weight of polymer, based on the solids content of the paper stock suspension.

Sheets with the pretreated fillers described above were then formed (examples 7-15 and comparative examples 5-10). The amount of filler used for this purpose was adapted so that the filler contents were about 20%, 30% and 40%. In the case of the pretreated fillers, the amount of slurry which has to be used in order to achieve a certain target value is always smaller than in the case of the untreated fillers.

In addition, comparative examples with untreated filler were carried out for each of the pretreated filler types (comparative examples 11-13). For this purpose, the amount of untreated filler slurry which is required in order to establish a filler content of about 20%, 30% and 40% was first determined in preliminary experiments. Sheets with the untreated fillers were then formed.

The paper sheets were produced in each case on a Rapid-Köthen sheet former according to ISO 5269/2, with a sheet weight of 70 g/m$^2$, and then dried for 7 minutes at 90° C.

Papers of Type B

EXAMPLES 16-24

COMPARATIVE EXAMPLES 14-22

A mixture of TMP (thermomechanical pulp) and groundwood was beaten gel-free in the ratio of 70/30 at a solids concentration of 4% in a laboratory pulper until a freeness of 45 SR was reached. The pH of the stock was in the range from 7 to 8. The beaten stock was diluted to a solids concentration of 0.35% by weight by addition of water.

In order to determine the behavior of the aqueous filler slurries described above in the production of filler-containing paper, in each case 500 ml of the paper stock suspension were initially taken and in each case the slurries treated according to the examples and the comparative examples and a cationic polyacrylamide as a retention aid (Polymin® KE 440, BASF Aktiengesellschaft) were metered into this pulp. The metered amount of the retention aid was in each case 0.01% by weight of polymer, based on the solids content of the paper stock suspension.

Sheets with the pretreated fillers described above were then formed (examples 16-24 and comparative examples 14-19). The amount of filler used for this purpose was adapted so that the filler contents were about 20%, 30% and 40%. In the case of the pretreated fillers, the amount of slurry which has to be used in order to achieve a certain target value is always smaller than in the case of the untreated fillers.

In addition, comparative examples with untreated filler were carried out for each of the pretreated filler types (comparative examples 20-22). For this purpose, the amount of untreated filler slurry which is required for establishing a filler content of about 20%, 30% and 40% was first determined in preliminary experiments. Sheets with the untreated fillers were then formed.

The paper sheets were produced in each case on a Rapid-Köthen sheet former according to ISO 5269/2, with a sheet weight of 80 g/m$^2$, and then dried for 7 minutes at 90° C. and then calendered with a nip pressure of 200 N/cm.

Testing of the Paper Sheets of Type A

After a storage time in a conditioned chamber at a constant 23° C. and 50% relative humidity for 12 hours, the dry breaking length of the sheets was determined according to DIN 54540 and the internal bonding strength according to DIN 54516 and the stiffness according to DIN 53121. The results are stated in table 1. The slurries corresponding to the comparative examples or the comparative examples with the paper sheets produced therefrom are characterized by the addition (CE). The other examples are examples according to the invention.

Testing of the Paper Sheets of Type B

After a storage time in a conditioned chamber at a constant 23° C. and 50% relative humidity for 12 hours, the dry breaking length of the sheets was determined according to DIN 54540 and the internal bonding strength according to DIN 54516. The dry pick resistance of the papers was determined using the IGT printability tester (ISO 3783). The results are stated in table 2. The slurries corresponding to the comparative examples or the comparative examples with the paper sheets produced therefrom are characterized by the addition (CE). The other examples are examples according to the invention.

TABLE 1

(Testing of the paper sheets of type A)

| Example or comparative example (CE) | Slurry according to example or comparative example (CE) | Filler content [%] | Dry breaking length [m] | Internal bonding strength [N] | Stiffness [mN] |
|---|---|---|---|---|---|
| 7 | 1 | 19.8 | 5391 | 343 | 83.7 |
| 8 | 1 | 29.9 | 4736 | 279 | 63.5 |
| 9 | 1 | 39.2 | 4011 | 242 | 46.8 |
| 10 | 2 | 21.3 | 5135 | 324 | 76.1 |
| 11 | 2 | 29.1 | 4447 | 261 | 58.9 |
| 12 | 2 | 40.3 | 3735 | 187 | 42.7 |
| 13 | 3 | 19.4 | 5367 | 341 | 83.5 |
| 14 | 3 | 28.9 | 4379 | 264 | 61.1 |
| 15 | 3 | 38.9 | 3698 | 179 | 46.3 |
| 5(CE) | 1 (CE) | 20.2 | 4675 | 257 | 78.4 |
| 6(CE) | 1 (CE) | 29.5 | 3701 | 153 | 43.9 |
| 7(CE) | 1 (CE) | 40.3 | 2815 | 101 | 30.5 |
| 8(CE) | 3 (CE) | 21.1 | 5189 | 305 | 76.1 |
| 9(CE) | 3 (CE) | 30.9 | 4212 | 234 | 46.9 |
| 10(CE) | 3 (CE) | 39.4 | 3218 | 167 | 33.5 |
| 11(CE) | PCC without pretreatment | 19.8 | 4291 | 214 | 76.3 |
| 12(CE) | PCC without pretreatment | 31.2 | 3286 | 143 | 43.5 |
| 13(CE) | PCC without pretreatment | 40.1 | 2387 | 79 | 26.9 |

TABLE 2

(Testing of the paper sheets of type B)

| Example or comparative example (CE) | Slurry according to example or comparative example (CE) | Filler content [%] | Dry breaking length [m] | Internal bonding strength J/sqm | IGT |
|---|---|---|---|---|---|
| 16 | 4 | 20.6 | 4331 | 326 | very good |
| 17 | 4 | 29.5 | 3328 | 261 | very good |
| 18 | 4 | 38.8 | 2519 | 211 | good |
| 19 | 5 | 20.4 | 4278 | 319 | very good |
| 20 | 5 | 28.6 | 3481 | 272 | very good |
| 21 | 5 | 40.9 | 2567 | 223 | good |
| 22 | 6 | 19.9 | 4289 | 308 | very good |
| 23 | 6 | 29.3 | 3391 | 255 | very good |
| 24 | 6 | 38.7 | 2459 | 198 | good |
| 14 (CE) | 2 (CE) | 20.9 | 3467 | 224 | good |
| 15 (CE) | 2 (CE) | 28.8 | 2634 | 157 | moderate |
| 16 (CE) | 2 (CE) | 40.8 | 1954 | 97 | poor |
| 17 (CE) | 4 (CE) | 21.5 | 3876 | 243 | very good |
| 18 (CE) | 4 (CE) | 30.2 | 2976 | 189 | good |
| 19 (CE) | 4 (CE) | 39.9 | 2274 | 149 | moderate |
| 20 (CE) | kaolin clay without pretreatment | 18.9 | 3275 | 206 | good |
| 21 (CE) | kaolin clay without pretreatment | 30.5 | 2451 | 146 | poor |
| 22 (CE) | kaolin clay without pretreatment | 41.1 | 1790 | 88 | poor |

We claim:

1. An aqueous slurry comprising a finely divided filler which is at least partly coated with a composition comprising at least one water-soluble amphoteric copolymer and at least one latex
wherein the aqueous slurry is obtained by a process comprising treating an aqueous slurry of a finely divided filler with at least one water-soluble amphoteric copolymer and at least one latex, wherein the water-soluble amphoteric copolymer is obtained by a process comprising copolymerizing a monomer mixture comprising
(a) at least one N-vinylcarboxamide represented by formula (I)

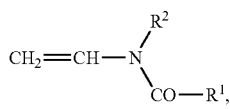

where $R^1$ and $R^2$, independently of one another, are H or $C_1$- to $C_6$-alkyl,
(b) at least one monomer which is selected from the group consisting of
($b_1$) monoethylenically unsaturated sulfonic acid, phosphonic acid, phosphoric acid ester, and derivatives thereof and
($b_2$) monoethylenically unsaturated monocarboxylic acid, monoethylenically unsaturated dicarboxylic acid, salts thereof and dicarboxylic anhydride,
(c) optionally at least one monoethylenically unsaturated monomer differing from the components (a) and (b), and
(d) optionally at least one compound which has at least two ethylenically unsaturated double bonds in the molecule,
with the proviso that the monomer mixture comprises at least one monomer (b) having at least one free acid group or an acid group in salt form, or both,
and subsequent partial or complete hydrolysis of the groups —CO—$R^1$ from the monomers (a) incorporated in the form of polymerized units in the copolymer.

2. The aqueous slurry according to claim 1, wherein the aqueous slurry is obtained by a process comprising treating an aqueous slurry of a finely divided filler with at least one water-soluble amphoteric copolymer and at least one latex, wherein the water-soluble amphoteric copolymer is obtained by a process comprising copolymerization of a monomer mixture comprising
(a) at least one N-vinylcarboxamide represented by formula (I)

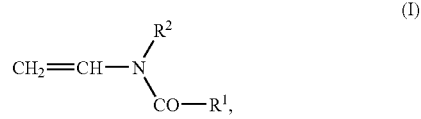

where $R^1$ and $R^2$, independently of one another, are H or $C_1$- to $C_6$-alkyl,
(b) at least one monomer from the group ($b_2$) which is selected from a monoethylenically unsaturated carboxylic acid having 3 to 8 carbon atoms and a water-soluble salt, such as alkali metal, alkaline earth metal and ammonium salt, of said carboxylic acid,
(c) optionally at least one monoethylenically unsaturated monomer differing from the components (a) and (b), and
(d) optionally at least one compound which has at least two ethylenically unsaturated double bonds in the molecule,
and subsequent partial or complete hydrolysis of the groups —CO—$R^1$ from the monomers (a) incorporated in the form of polymerized units in the copolymer.

3. The aqueous slurry according to claim 1, wherein the aqueous slurry is obtained by a process comprising treating an aqueous slurry of a finely divided filler with at least one water-soluble amphoteric copolymer and at least one latex, the water-soluble amphoteric copolymer is obtained by a process comprising copolymerization of a monomer mixture comprising
(a) N-vinylformamide,
(b) acrylic acid, methacrylic acid, and/or the alkali metal or ammonium salts thereof, and
(c) optionally another monoethylenically unsaturated monomer,
and subsequent partial or complete hydrolysis of the vinylformamide units present in the copolymers.

4. The aqueous slurry according to claim 3, wherein the hydrolysis of the vinylformamide units present in the copolymers is effected by the action of an acid, a base or an enzyme.

5. The aqueous slurry according to claim 1, wherein the degree of hydrolysis of the vinylcarboxamide group incorporated in the form of polymerized units is from 0.1 to 100 mol %.

6. The aqueous slurry according to claim 1, wherein the water-soluble amphoteric copolymer comprises
(i) from 1 to 98 mol %, of vinylcarboxamide units,
(ii) from 1 to 98 mol %, of units of a monoethylenically unsaturated sulfonic acid, a phosphonic acid, a phosphoric acid ester or derivatives thereof, or units of monoethylenically unsaturated monocarboxylic acid, monoethylenically unsaturated dicarboxylic acid, salts thereof and dicarboxylic anhydride, and from 1 to 98 mol %, of units of at least one monoethylenically unsaturated carboxylic acid having 3 to 8 carbon atoms, (iii) from 1 to 98 mol %, of vinylamine units of formula (II) or amidine units of formula (III) or amidine units of formula (IV), or mixtures thereof

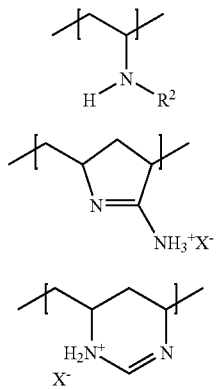

where, in the amidine units (III) and (IV), X" in each case is an anion, and (iv) up to 30 mol % of units of at least one other monoethylenically unsaturated compound.

7. The aqueous slurry according to claim 1, wherein the water-soluble amphoteric copolymer comprises
   (i) from 5 to 70 mol % of vinylcarboxamide units,
   (ii) from 3 to 30 mol % of units of monoethylenically unsaturated sulfonic acid, phosphonic acid and salts thereof, or from 5 to 45 mol % of units of acrylic acid, methacrylic acid, salts and mixtures thereof, and
   (iii) from 10 to 50 mol % of vinylamine units in salt form or amidine units of formula (III), amidine units of formula (IV), or mixtures thereof.

8. The aqueous slurry according to claim 1, wherein the aqueous slurry is obtained by a process comprising treating an aqueous slurry of a finely divided filler with at least one water-soluble amphoteric copolymer and at least one latex, wherein the water-soluble amphoteric copolymer is obtained by a process comprising copolymerization of a monomer mixture comprising
   (b) at least one monomer which is selected from the group consisting of
      ($b_1$) monoethylenically unsaturated sulfonic acid, phosphonic acid, phosphoric acid ester and derivatives thereof, and
      ($b_2$) monoethylenically unsaturated mono-carboxylic acid, monoethylenically unsaturated dicarboxylic acid, salts thereof and dicarboxylic anhydride,
   (e) at least one ethylenically unsaturated monomer which carries a cationic group or a group to which a cationic charge can be imparted by protonation, or both,
   (f) optionally at least one monoethylenically unsaturated monomer differing from the components (b) and (e), and
   (d) optionally at least one compound which has at least two ethylenically unsaturated double bonds in the molecule.

9. The aqueous slurry according to claim 8, wherein the aqueous slurry is obtained by a process comprising treating an aqueous slurry of a finely divided filler with at least one water-soluble amphoteric copolymer and at least one latex, wherein the water-soluble amphoteric copolymer is obtained by a process comprising copolymerization of a monomer mixture of
   (b) at least one monomer from the group ($b_2$) which is selected from a monoethylenically unsaturated carboxylic acid having 3 to 8 carbon atoms and the water-soluble salt, such as alkali metal, alkaline earth metal and ammonium salt, of said carboxylic acids,
   (e) at least one ethylenically unsaturated monomer which is selected from the group consisting of an ester of $\alpha,\beta$-ethylenically unsaturated mono-carboxylic acid and $\alpha,\beta$-ethylenically unsaturated didicarboxylic acid with $C_2$-$C_{12}$-amino alcohol which may be $C_1$-$C_8$-monoalkylated or $C_1$-$C_8$-dialkylated on the amine nitrogen, and the quaternization products of said ester with $C_1$-$C_8$-alkyl chloride, $C_1$-$C_8$-dialkyl sulfate, $C_1$-$C_{16}$-epoxide or benzyl chloride,
   (f) optionally at least one monoethylenically unsaturated monomer which differs from the components (b) and (e) and is selected from the group consisting of a N-vinylcarboxamide of the general formula (I)

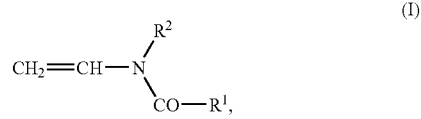

where $R^1$ and $R^2$ independently of one another, are H or $C_1$- to $C_6$-alkyl, (meth)acrylamide or (meth)acrylonitrile, and (d) optionally at least one compound which has at least two ethylenically unsaturated double bonds in the molecule.

10. The aqueous slurry according to claim 8, wherein the aqueous slurry is obtained by treating an aqueous slurry of a finely divided filler with at least one water-soluble amphoteric copolymer and at least one latex, wherein the water-soluble amphoteric copolymer is obtained by a process comprising copolymerization of a monomer mixture of
   (b) acrylic acid, methacrylic acid, or the alkali metal or ammonium salt thereof, or a mixture thereof,
   (e) dimethylaminoethyl (meth)acrylate methochloride,
   (f) N-vinylformamide, acrylamide or acrylonitrile, or a mixture thereof.

11. The aqueous slurry according to claim 1, wherein the aqueous slurry is obtained by a process comprising treating an aqueous slurry of a finely divided filler with at least one water-soluble amphoteric copolymer and at least one latex, wherein the water-soluble amphoteric copolymer is obtained by a process comprising copolymerization of a monomer mixture comprising
   (b) at least one monomer from the group ($b_2$) which is selected from a monoethylenically unsaturated carboxylic acid having 3 to 8 carbon atoms and a water-soluble salt, such as alkali metal, alkaline earth metal and ammonium salt, of said carboxylic acids,
   (e) at least one ethylenically unsaturated monomer which is selected from the group consisting of an ester of $\alpha,\beta$-ethylenically unsaturated mono-carboxylic acid and $\alpha,\beta$-ethylenically unsaturated didicarboxylic acid with $C_2$-$C_{12}$-amino alcohol which may be $C_1$-$C_8$-monoalkylated or $C_1$-$C_8$-dialkylated on the amine nitrogen, and a quaternization product of said ester with $C_1$-$C_8$-alkyl chloride, $C_1$-$C_8$-dialkyl sulfate, $C_1$-$C_{16}$-epoxide or benzyl chloride, (f) optionally at least one monoethylenically unsaturated monomer which differs from the components (b) and (e) and is selected from the group consisting of a N-vinyl-carboxamide of the general formula (I)

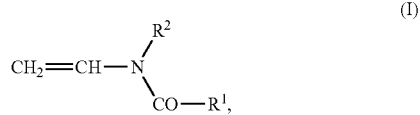

where $R^1$ and $R^2$ independently of one another, are H or $C_1$- to $C_6$-alkyl, (meth)acrylamide or (meth)acrylonitrile, and (d) optionally at least one compound which has at least two ethylenically unsaturated double bonds in the molecule.

12. The aqueous slurry according to claim 1, wherein the aqueous slurry is obtained by a process comprising treating an aqueous slurry of a finely divided filler with at least one water-soluble amphoteric copolymer and at least one latex, wherein the water-soluble amphoteric copolymer is obtained by a process comprising copolymerization of a monomer mixture comprising (b) acrylic acid, methacrylic acid, or the alkali metal or ammonium salt thereof, or a mixture thereof, (e) dimethylaminoethyl (meth)acrylate methochloride, (f) N-vinylformamide, acrylamide or acrylonitrile, or a mixture thereof.

13. The aqueous slurry according to claim 1, wherein the aqueous slurry comprises from 1 to 70% by weight of at least one finely divided filler.

14. The aqueous slurry according to claim 1, wherein the amount of water-soluble amphoteric copolymer is from 0.01 to 5% by weight, based on the filler.

15. The aqueous slurry according to claim 1, wherein the latex comprises at least 40% by weight of a so-called main monomer (g) which is at least one monomer selected from the group consisting of $C_1$-$C_{20}$-alkyl (meth)acrylate, vinyl ester of carboxylic acid comprising up to 20 carbon atoms, vinyl aromatic having up to 20 carbon atoms, ethylenically unsaturated nitrile, vinyl halides, vinyl ether of alcohol comprising 1 to 10 carbon atoms, or aliphatic hydrocarbon having 2 to 8 carbon atoms and one or two double bonds.

16. The aqueous slurry according to claim 15, wherein the latex is composed of at least 60% by weight of butadiene or mixtures of butadiene and styrene or of at least 60% by weight of $C_1$-$C_{20}$-alkyl (meth)acrylates or mixtures of $C_1$-$C_{20}$-alkyl (meth)acrylates with styrene.

17. The aqueous slurry according to claim 1, wherein the aqueous slurry additionally comprises a swollen starch.

18. The aqueous slurry according to claim 17, wherein the starch is a natural starch selected from the group consisting of potato, corn, rice or tapioca starch or is a chemically modified starch.

19. The aqueous slurry according to claim 17, wherein the amount of swollen starch is from 0.1 to 10% by weight, based on the filler.

* * * * *